United States Patent [19]

Wing-Chung

[11] Patent Number: 5,549,035
[45] Date of Patent: Aug. 27, 1996

[54] COFFEE MAKING MACHINES

[75] Inventor: Li Wing-Chung, Taikoo Shing, Hong Kong

[73] Assignee: Simatelex Manufactory Co., Ltd., Chaiwan, Hong Kong

[21] Appl. No.: 407,564

[22] Filed: Mar. 21, 1995

Related U.S. Application Data

[63] Continuation-in-part of Ser. No. 226,805, Apr. 12, 1994, abandoned.

[51] Int. Cl.[6] ............................................. A47J 31/10
[52] U.S. Cl. .......................... 99/281; 99/285; 219/505
[58] Field of Search .......................... 99/280, 281, 285; 219/497, 505

[56] References Cited

U.S. PATENT DOCUMENTS

| | | | |
|---|---|---|---|
| 4,292,888 | 10/1981 | Wells et al. | 99/281 |
| 4,404,462 | 9/1983 | Murray | 219/497 |
| 4,412,481 | 11/1983 | Oota et al. | 99/280 |
| 4,484,515 | 11/1984 | Illy | 99/285 |
| 4,949,627 | 8/1990 | Nordskog | 99/281 |
| 5,183,998 | 2/1993 | Hoffman et al. | 99/281 |
| 5,193,139 | 3/1993 | Schiettecatte | 99/281 |
| 5,334,817 | 8/1994 | Nakamori et al. | 219/497 |

*Primary Examiner*—David Scherbel
*Assistant Examiner*—Terrence R. Till
*Attorney, Agent, or Firm*—Loeb & Loeb LLP

[57] ABSTRACT

A coffee machine includes a microcomputer, a heater 14 and a thermistor element 17. The microcomputer is programmed to respond to several different temperature level signals provided by the element 17 for fully controlling operation of the heater. The machine has a pre-heat cycle, where the rate of temperature rise is slowed down, and an automatic cleaning cycle when required.

5 Claims, 9 Drawing Sheets

| LOWER TEMP. °C (TURN ON) | UPPER TEMP. °C (TURN OFF) |
|---|---|
| 138 | 154 |
| 132 | 148 |
| 126 | 142 |
| 120 | 136 |
| 114 | 130 |
| 108 | 124 |
| 102 | 118 |
| | |

TEMP. SETTINGS (RANGES)

FIG. 8

COFFEE MAKING MACHINES

This is a continuation-in-part of U.S. Ser. No. 08/226,805 now abandoned.

The invention relates to coffee making machines.

Coffee making machines are in wide use for making coffee by running hot water over ground coffee supported in a filter and collecting the coffee in a container below the filter. The container is normally kept warm and the coffee drained into cups as required for consumption. It is known to provide temperature responsive electrical switches which turn ON and OFF to control automatically the supply of current to heating elements in the machines to prevent over-heating or maintain a low level of heating, for a keep-warm function for example.

Present machines have controllers which enable various other functions to be provided such a delayed time starts, small batch preparation and safety features to prevent over-heating, and automatic turn OFF after a certain time period. Currently, the controllers are responsive where appropriate to mechanically set temperature sensors, although they may be mechanically settable to respond to chosen different fixed temperatures, to control power supplies to heating elements. As such, control of present coffee making machines is restricted and incapable, broadly speaking, of making use of the full capability of general or special programmable microcircuit devices.

It is an object of the invention to overcome or at least reduce this limitation.

According to the invention there is provided a coffee making machine having a water reservoir, a hopper for holding coffee grounds and for receiving water from the reservoir, and a container to collect coffee from the hopper, including a heater having electrical heating elements for heating water stored in the reservoir, a temperature sensitive electrical component associated with the heater to provide a plurality of temperature signals dependent on its temperature, and a microcomputer programmed to control operations of the machine and to respond to at least two different temperature signals of the electrical component to turn a heater power supply ON and OFF.

The coffee making machine may have a pre-heating feature, in which the microcomputer is programmed during an initial period to turn the heater power ON and OFF at regular intervals to slow down the rate the water is heated up.

The heater may be a heat pump arrangement consisting of metallic body having a hollow tube for the water and a closely associated electrical heating element mounted in the body, and the machine has a small batch feature for which the microcomputer is programmed to turn the heater power ON and OFF at regular intervals to slow down the overall flow rate of water out of the heat pump.

The microcomputer may be programmed to generate a clean signal whenever the temperature signal exceeds predetermined high value during a normal heating cycle for more than a set period of time.

The microcomputer may be programmed to inhibit the power supply to the heater whenever the temperature signals are indicative that the electrical component is in an open circuit or near a short circuit condition.

The coffee machine may have a cleaning feature in which the microcomputer is programmed to continue the preheat feature for an extended period of time so as to heat cleaning solution entered in the heater to a higher temperature and for much longer than would otherwise be the case.

A coffee machine may have a keep warm feature including a second temperature sensitive electrical component located to measure the temperature of the container, and in which the heater is arranged to be switched on for heating periods whenever its temperature is between a selected range of temperatures and in which the microcomputer is programmed to compare a chosen temperature and the container temperature after a number of heating periods and to raise or lower the selected range accordingly for the next period if necessary, to cause the actual and chosen temperature to become substantially the same.

Coffee making machines will now be described by way of example with reference to the accompanying drawings in which.

Figure 1:
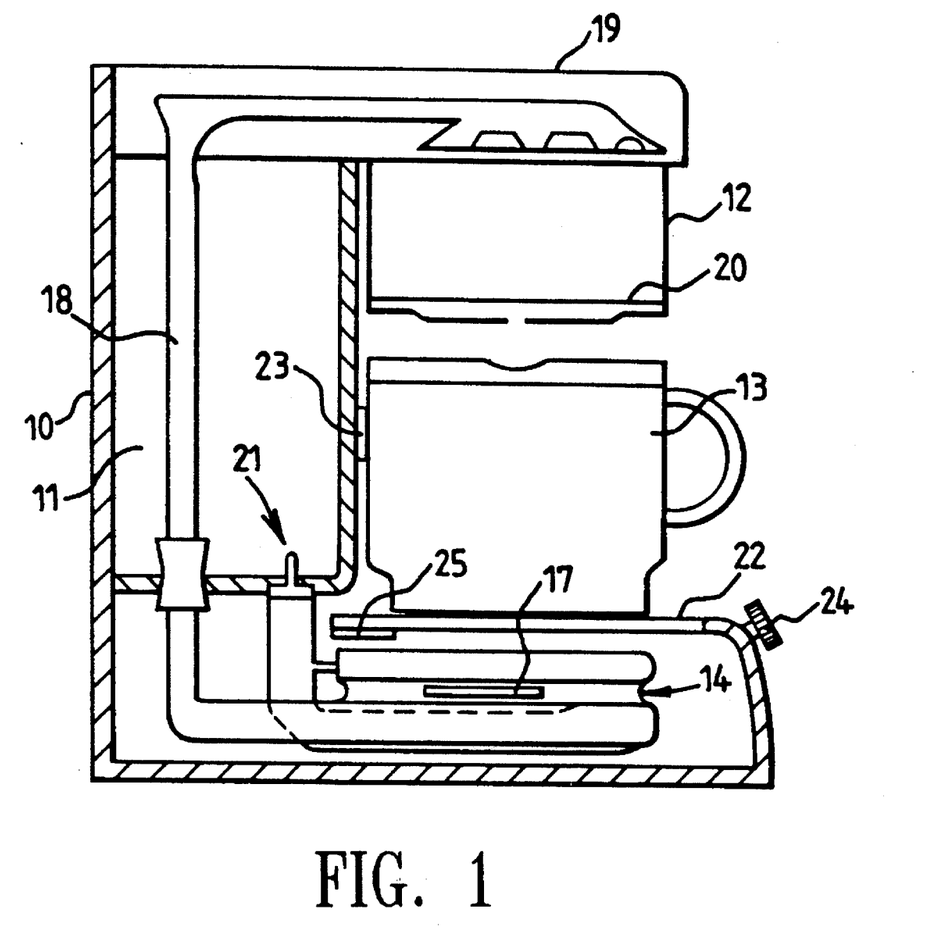
FIG. 1 is a general schematic side view of one machine.
Figure 1A:
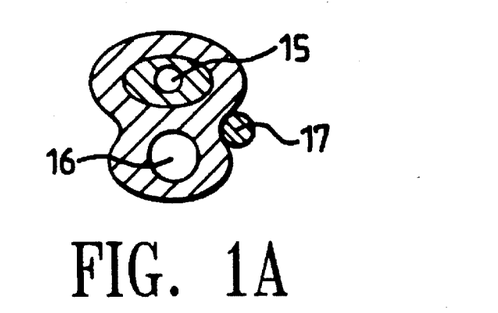
FIG. 1A is a cross-sectional view of a heater for the machine.

Referring to the drawings, in FIG. 1 the coffee machine comprises a housing 10 which surrounds a water reservoir 11, a hopper 12 and a container 13. A heater 14, which is in the form of so called a "heat pump", consists of a metallic body providing coiled hollow tube 15 for water and an adjacent tube incorporating a heating element 16 (see FIG. 1A). A thermistor element 17 is mounted against the outside surface of the heater 14.

The described overall general configuration of the coffee machine is well known and, in use, water is heated in the heater tube 16 and evaporates and passes up a tube 18 and through a passage 19 to condense and drip into the top of the hopper 12. A filter paper 20 in the hopper normally supports a measured quantity of ground coffee and "brewed" coffee collects in the container 13. At first, a valve 21 is held closed by water pressure but as hot water is pumped or passes up the tube 18, the valve opens to allow water to flow into the tube 15. In practice, the valve opening is intermittent to provide a "pump" action. A plate 22 supports the container 13 and the electric heating element 16 is used after the coffee has been brewed to keep coffee in the container 13 warm as required. A pressure switch 23 is mounted on the side of the housing 10 so that the presence or absence of the container 13 in position on the plate 22 can be monitored. A rotary keep-warm temperature selector switch 24 is mounted on the housing 10 and a thermistor 25 attached to the underside of the plate 22.

Figure 2:
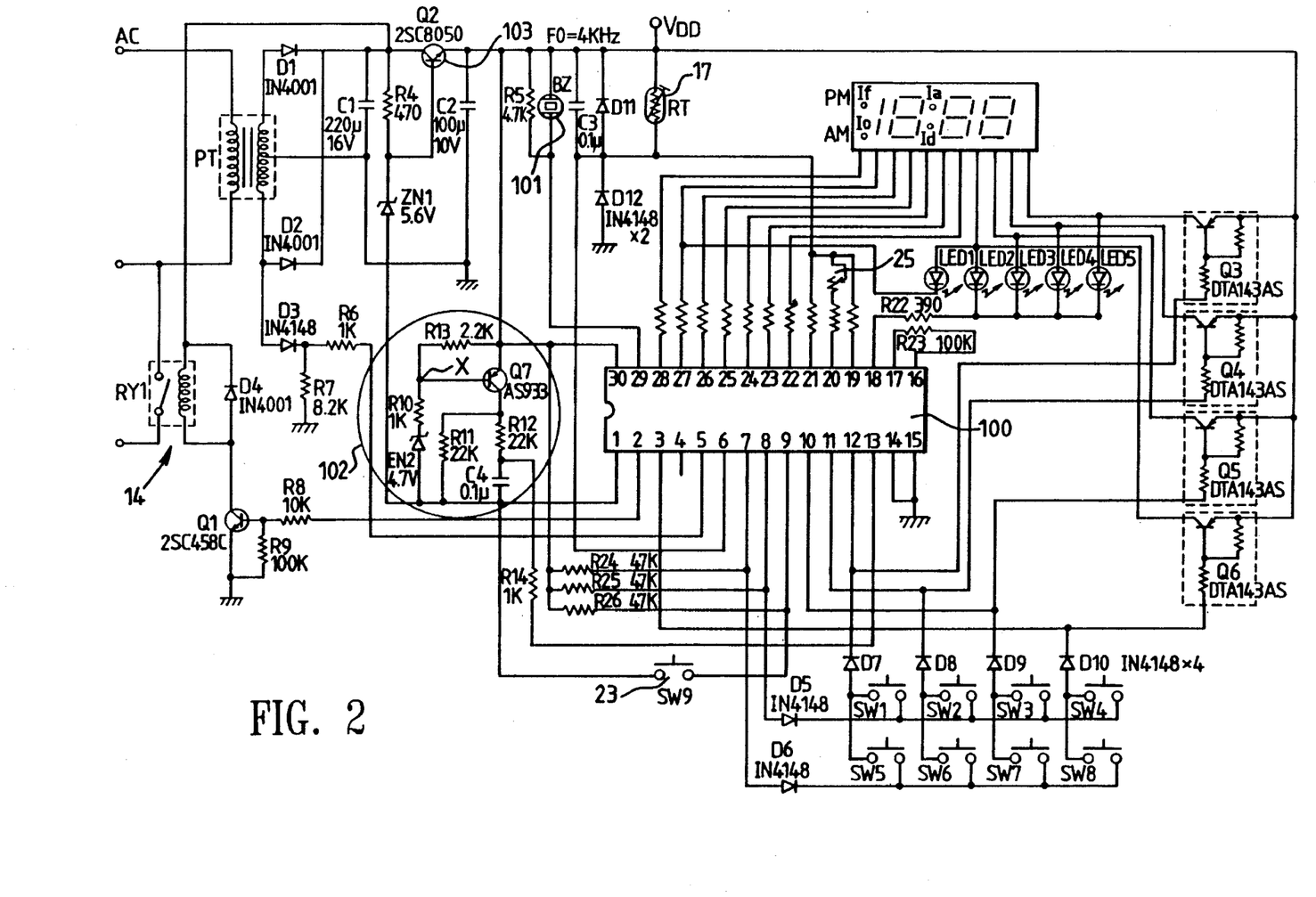
FIG. 2 is a diagram of an electrical circuit for the machine.

In FIG. 2, the main components of the circuit are a microcomputer 100, the heating element 16 and a thermistor element 17. There is also a buzzer 101, the container detector or pressure switch 23, a reset circuit 102, an input voltage regulator 103, and a variable resistor 25 attached to switch 24 (of FIG. 1) for selecting a chosen temperature range.

The microcomputer 100 is programmed to fully control the operation of the coffee making machine, as will be explained in the description below, and relies for most of its functions on different temperature level signals provided by the thermistor element 17. These levels are determined in accordance with the effective resistance of the thermistor element 107 at any particular time. The microcomputer 100 is programmed so as to be inherently capable of responding to various values of electric resistance (generally up to sixteen different values) and this number can be increased as is shown in the described circuit by connecting three different resistors R1, R2 and R3 in series with the thermistor element 17. This allows at least three ranges of sensitivity or temperature levels. In this way, the full capability of the microcomputer 100 can be utilised based on being programmed to monitor and respond to various temperatures to more carefully control the operation of the coffee machine. This enables in addition more functions or variations to be offered, including safe working, than was hitherto possible.

The microcomputer 100 is reset at any starting moment by a zero to one pulse which is generated by the reset circuit 103. When a 5 volt supply is connected to the reset circuit 103, this is greater than the voltage threshold of a zener diode ZN2, a point X goes low and a transistor Q7 is turned ON to charge up a capacitor C4. A point B goes high and disenables a reset pin 13 of the microcomputer 100. Whenever the voltage supply falls below the zener diode ZN2 threshold, the voltage at the base of the transistor Q7 goes high and the transistor Q7 turns OFF. The capacitor C4 then discharges via resistors R10 and R11. The point B therefore goes low to reset the microprocessor 100. The advantage of this reset circuit is that when the power to the machine is switched or turns OFF and then ON again quickly, the microprocessor 100 is properly reset because the circuit uses a high state reference for the reset point.

Figure 3:
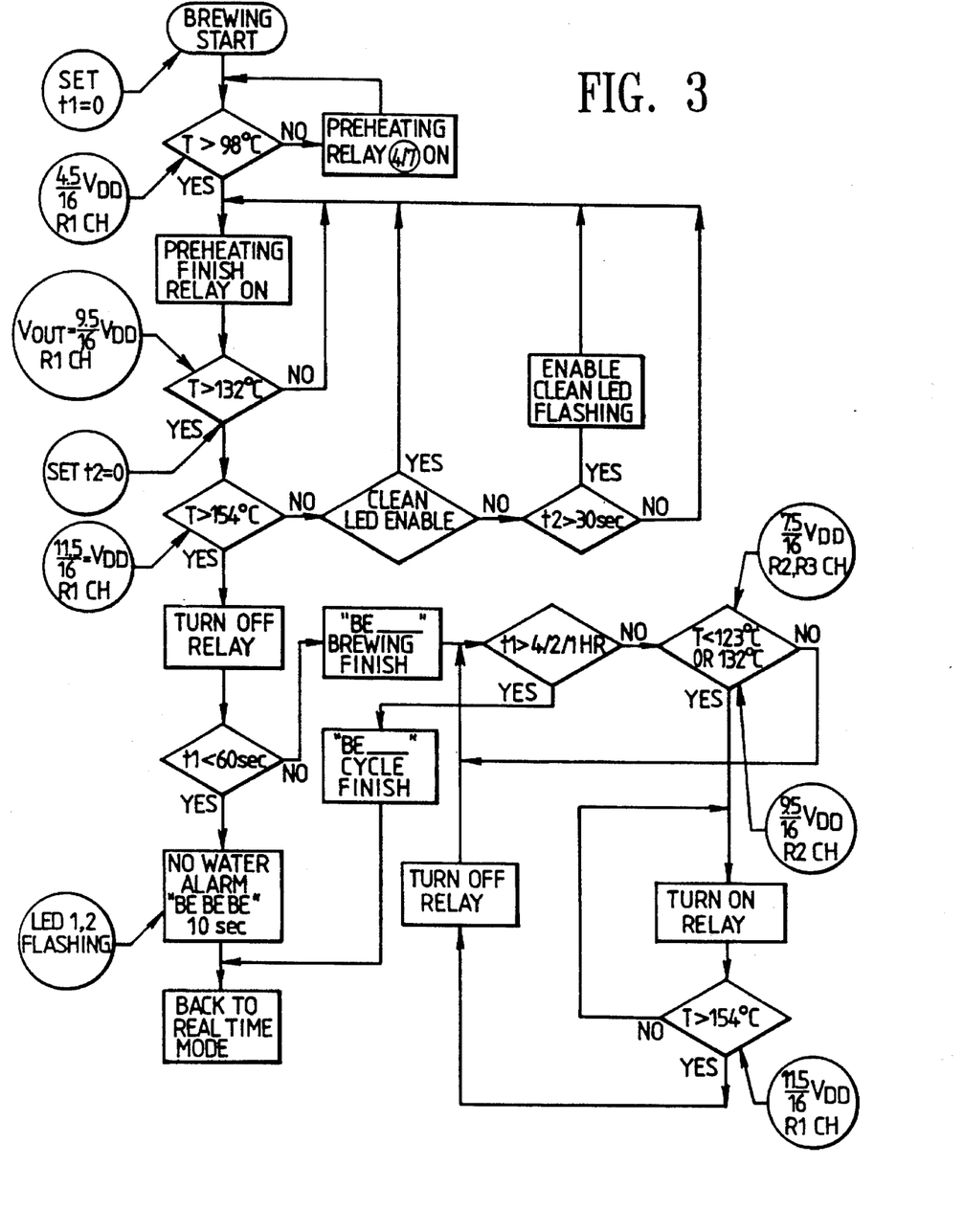
FIG. 3 is a flow chart for making a quantity of coffee.

Referring to FIG. 3, the flow chart indicates a normal brewing cycle. During an initial heating period, a so-called pre-heating feature is incorporated. During preheating the heater is turned intermittently ON and OFF by the microcomputer until the temperature of 98° C. (T4) at the thermistor element 17 is reached. The heater is cycled by being turned ON for 7 seconds and OFF for 4 seconds until the temperature rises to 98° C.; this normally takes about half a minute. The intermittent turning ON and OFF has the effect of slowing down the rate at which the water in the heater heats up. This slowing down allows time for water in the tube 18 to heat up as well, predominantly by conduction, so that the first water to be poured on to the coffee in the filter 20 is much hotter than would otherwise be the case. After one minute provided a temperature of 98° C. has been reached, the heater remains continually ON until the temperature T5 (132° C.) is reached. During this time and thereafter, water is "pumped" by the heater up the tube 18 as required and replenished by water from the reservoir 11 via the one-way valve 21. When the temperature reaches T6 (154°), the heater 14 is turned off. Such a temperature normally indicates that there is no water in the heater tube 16, and therefore all the water has been pumped up the tube 18 and into the filter, and the reservoir 11 is empty. This completes the brewing cycle.

The flow chart of FIG. 3 also indicates how a clean signal is generated. As soon as the temperature first rises to 132° C. a starting time is set. If the temperature does not rise to 154° within a time period of over 30 seconds, from the starting time, a clean signal is generated. This illuminates a clean signal LED. If within 30 seconds, the temperature of 154° C. is reached no clean signal is generated. It will be noted that the heater remains ON if a clean signal is generated and remains ON after the LED is illuminated. The clean signal is therefore produced if the temperature rises above a predeterminal high value (in this embodiment above 132° C. but below 154° C.) for more than a set period of time (in this embodiment for longer than at least 30 seconds).

It will be noted from the flow chart that if the temperature of 154° C. is reached very quickly, in less than 1 minute in this example, a "NO WATER" alarm is generated. This alarm is provided to show that the reservoir 11 is empty, or was not sufficiently filled, when the heater was first turned ON. The power to the heater is automatically turned OFF.

In normal situations, once power to the heater 14 has been turned OFF at the end of a brewing cycle, the coffee in the container 13 is kept warm by the heater 14. The power to the heater 14 is thereafter turned ON and OFF by the microcomputer 100 as shown in the flow chart. When the temperature of the thermistor element is between 116° C. and 132° C., the heater is turned ON. The actual temperature being selected by the setting of the rheostat 25 determined by the user's positioning of the switch 24. When the temperature rises to 154° C. the heater is turned OFF. However, the heater 14 is turned OFF finally anyway after 1, 2 or 4 hours according to a user timer setting to terminate the keep warm feature of the coffee making machine.

Figure 4:
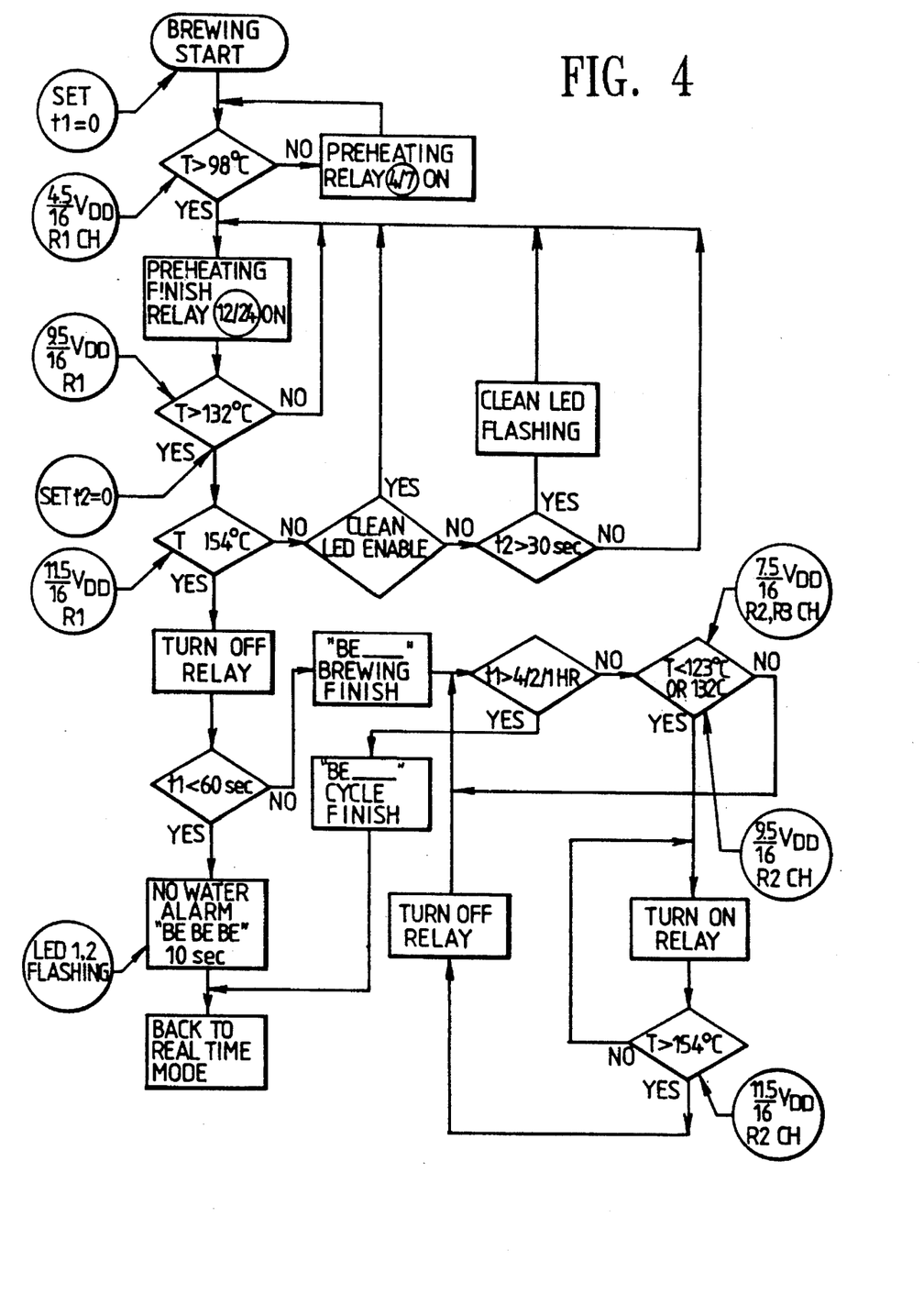
FIG. 4 is a flow chart for making a smaller quantity of coffee.

In FIG. 4, the flow chart is for brewing a small batch, say 2 to 4 cups. The chart is generally the same as described in FIG. 3 for a normal batch. The difference is that after the preheating period, the power to the heater 14 is continued to be intermittently controlled to be turned ON and OFF, being turned OFF every 12 seconds for 12 seconds. This has the effect of slowing the otherwise normal rate of flow of water up the tube 18 and into the hopper 12. The temperature threshold for triggering a clean signal is also lowered from 132° C. to 124° C., but the same set time, of 30 seconds is used.

Figure 5:
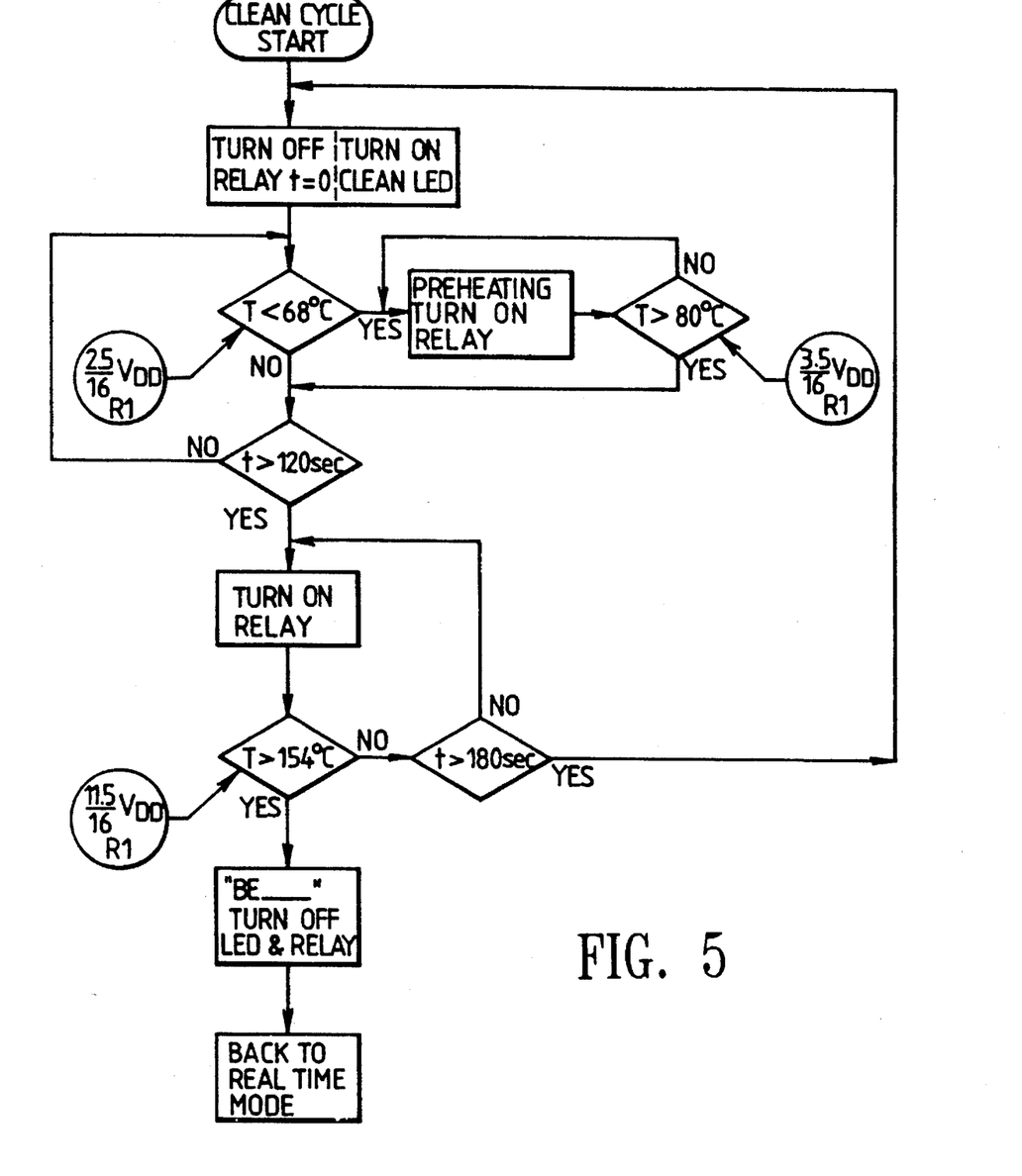
FIG. 5 is a flow chart for a cleaning cycle for the machine.

In FIG. 5, the flow chart for a cleaning cycle is shown. The coffee making machine is filled with a cleaning liquid, for example a dilute vinegar solution, and switched ON. In the cleaning cycle, a timer is started and initially the power is turned ON and OFF to maintain the thermistor element between 68° C. (T7) and 80° C. (T8) for at least two minutes. After the two minutes the heater is turned ON continuously, and the temperature allowed to rise. If the temperature does not rise to 154° C. within 180 seconds after the start of the timer, the cleaning solution in the tube 16 will pump out and new cleaning solution enter the tube 16 from the reservoir 11. After 180 seconds, the starter resets and the cycle begins again with the heater controlled to be turned ON and OFF between the temperature 68° C. and 80° C. as before. The clean cycle finishes when the temperature rises above 154° C.

This means generally that batches of liquid remains in the tube 16 during a cleaning cycle at a higher temperature and for a longer period than for normal brewing.

As explained, the microcomputer 100 is programmed to provide a cleaning warning signal. This is derived by monitoring the temperature during either of the brewing cycles shown in FIG. 3 or 4. It has been found that if the temperature of the thermistor element 17 is unusually high during brewing, say above 132° C. or 124° C. respectively, then the tube 16 requires cleaning. The time of the unusual high temperatures is monitored to allow the temperature to rise at the end of normal brewing cycles or to tolerate transient excursions that may occur.

The most common contamination is caused by deposits of salts out of the water, and especially calcium carbonate forming as a layer on the inside surface of the tube 16. This is effectively removed by treatment with vinegar in a cleaning cycle as described.

The microcomputer 100 is programmed to respond to two other particular temperatures signals, or more accurately, to two conditions of the thermistor element. Should the thermistor element have a very low effective resistance or a very high effective resistance, this would indicate a near short-circuit condition or an open-circuited condition respectively. In either event, the microcomputer 100 provides a thermistor element failure alarm and automatically turns off or inhibits any power supply to the heater 14 if the effective resistance is very low or very high.

The pressure detector 23 responds to detect whether the container 13 being present or not on the platform 22. When the container 13 is absence, an unloaded signal passes to the microcomputer 100 which responds to cut off power to the heater 14 after 1 minute if normal brewing is selected and 2 minutes if small batch brewing is selected. This avoids hot water flowing from the hopper 12. Brewing is started again by the microcomputer 100 as soon as the container 13 is placed on the platform.

The microcomputer 100 controls various indicators and responds to various input commands provided by operator switches. Generally such aspects are well known when domestic appliances are controlled by electronic circuits and small computers. The advantage provided by embodiments of this invention is the single electrical temperature dependent element is used to provide various temperature dependent signals and the microcomputer is programmed to respond to specific two or more temperatures or chosen ranges of temperatures to satisfactorily control a coffee making machine. The wide range of features possible include not only careful control of brewing cycles but also safety features (to turn off the heater if the temperature sensitive element totally fails, for example), pre-heating, and automatic cleaning procedures and advisory signals.

Figure 6:
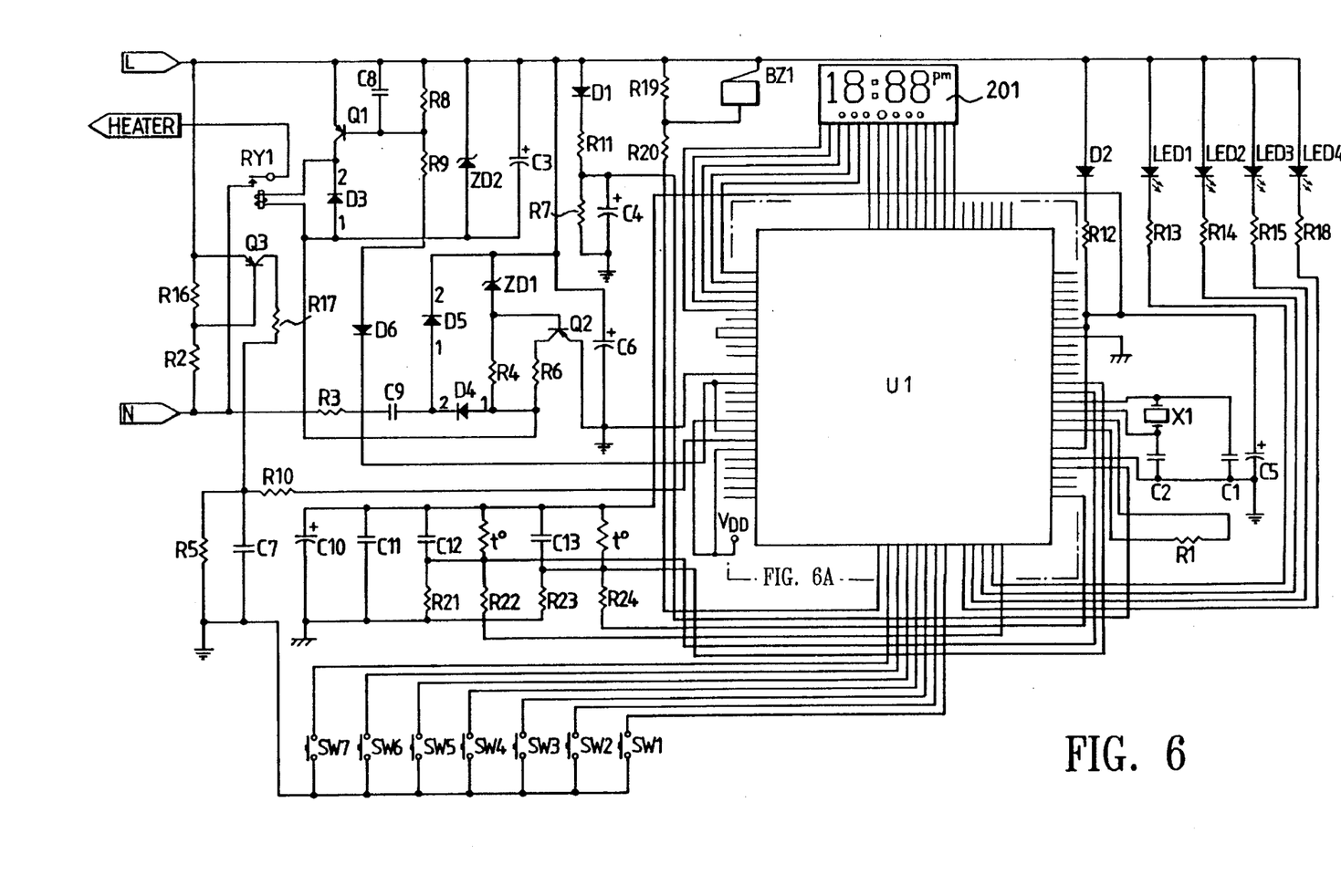
FIG. 6 is a diagram of an electrical circuit for another coffee making machine.
Figure 6A:
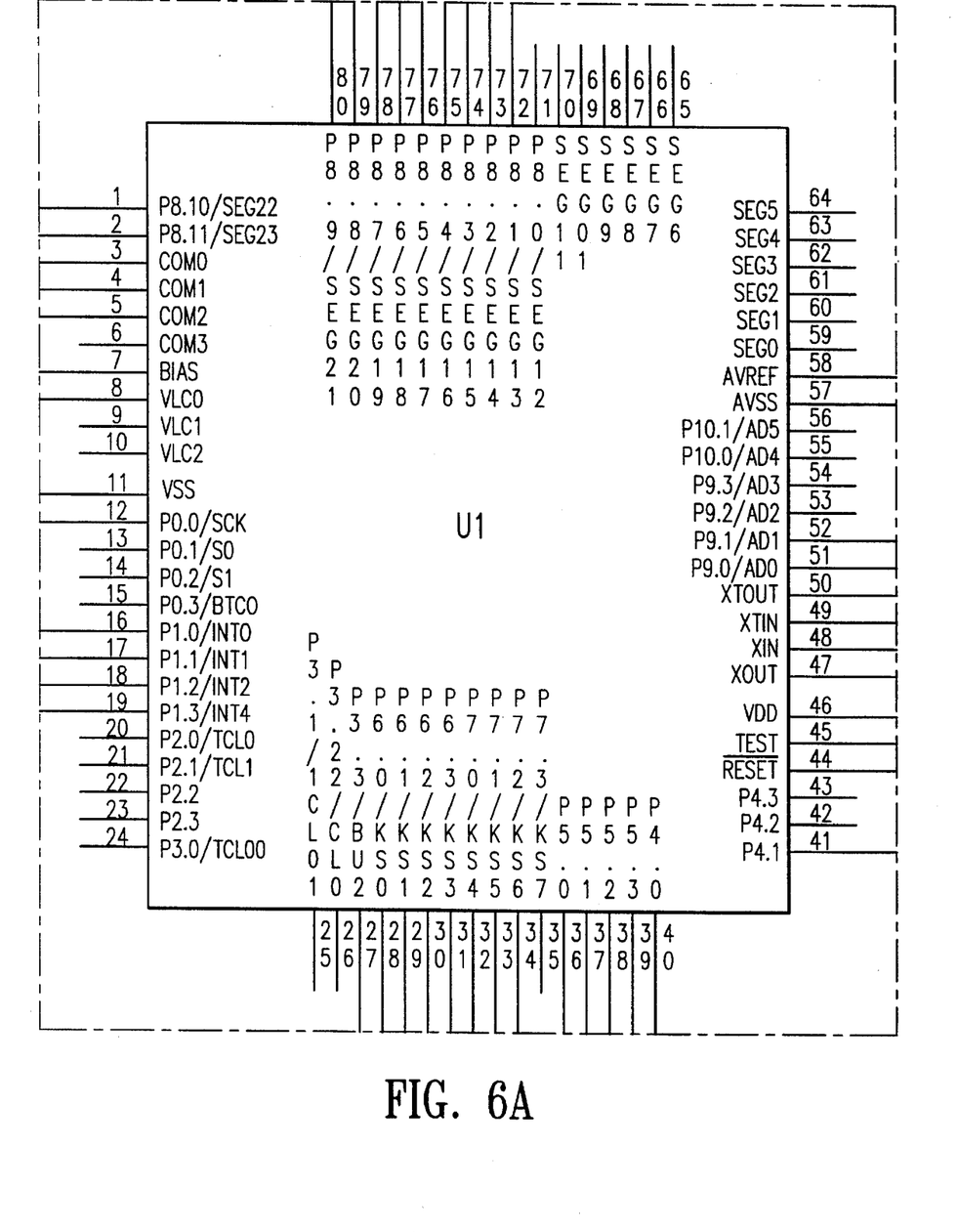

Referring to FIG. 6, the circuit is generally similar to the circuit shown in FIG. 2. Some but not all the same components have been shown with the same numbers or references but for general comprehension it will be sufficient to read the description of the circuit of FIG. 6 that follows. The main distinctive components however comprise thermistors NTC1 and NTC2; NTC1 is equivalent to thermistor 17 in FIG. 2.

Basically, all functions are performed by a microcomputer U1 which drives a display 201 with indicators and controls a power switch RY1 for supplying power to a heating element. Further, the microcomputer U1 receives signals from the thermistors NTC1 and NTC2 as required. The display 201 is a custom designed LCD liquid crystal display having 4 digits, a colon and "pm" sign to show the time. The display also has a bar formed by dots to represent a keep warm temperature setting. A "+" and "−" sign can be allocated at respective sides of the bar for indicating a direction of temperature increment or decrement.

The microcomputer U1 requires a 5 volt power supply at its Vss and VDD inputs. The power is provided in practice via an electrical cord from a domestic main supply and passed through rectifier diodes D4 and a regulating circuit. The regulating circuit is comprised by resistors R3, R4, R6, zener diode ZD1, capacitors C6 and a transistor Q2. The alternating voltage is rectified by the diode D4 and regulated and filtered by the regulating circuit to provide 5 V to the Vss and VDD inputs of the microcomputer.

The microcomputer has separate key inputs to activate different functions which are connected to Vss (Ground) when keys are respectively pressed. Once the key is pressed, a low level voltage signal is sent to a corresponding key input. The microcomputer U1 can distinguish which key has been pressed, whether the key is held pressed or not. The microcomputer U1 is arranged to send out signals to the display 201 and the power switch RY1 for carrying out corresponding functions. Moreover, the microcomputer incorporates analogue to digital convertors to convert thermal sensor signals for comparison with programmed digital temperature level signals. Therefore, the microcomputer U1 can respond in accordance with the effective resistance of the thermistors NTC1 and NTC2 at any particular time to enable many more functions or variations to be provided, including safe working, than was hitherto possible.

The circuit in FIG. 6 includes a reset arrangement. A reset signal is generated at any starting moment by the reset arrangement. The reset arrangement is composed by two resistors R7 and R11 and a capacitor C4 that utilises charging and discharging properties of CR circuit to generate the reset signal. The microcomputer U1 current state is cleared and starts each time the microcomputer receives the reset signal. However, if the system is powered down accidently; the microcomputer U1 enters a low current consumption mode and retains some registers current values. At that moment, the microcomputer power is supplied by a single capacitor C5 but the capacitor voltage and current will decay exponentially. When this voltage drops to a certain value, say 2.7 V, the microcomputer U1 will become inoperational. Before this voltage drops below 2.7 V if the power is turned on again the microcomputer U1 will recover to its original state and take control again. Therefore, the reset signal is normally arranged just below any supply voltage drop of 2.7 V to allow the microcomputer U1 to recover, if the power is restored at a voltage of 2.7 volts or higher.

The microcomputer U1 is programmed to provide a 4 khz buzzer signal at particular times to indicate brewing finish, keep warm finish and so on. Indicators LED 1 to LED 4 have associated microcomputer outputs signals to control them. The indicators are excited through four separated 1.5 K ohm current limiting resistors R13 to R16.

Figure 7:
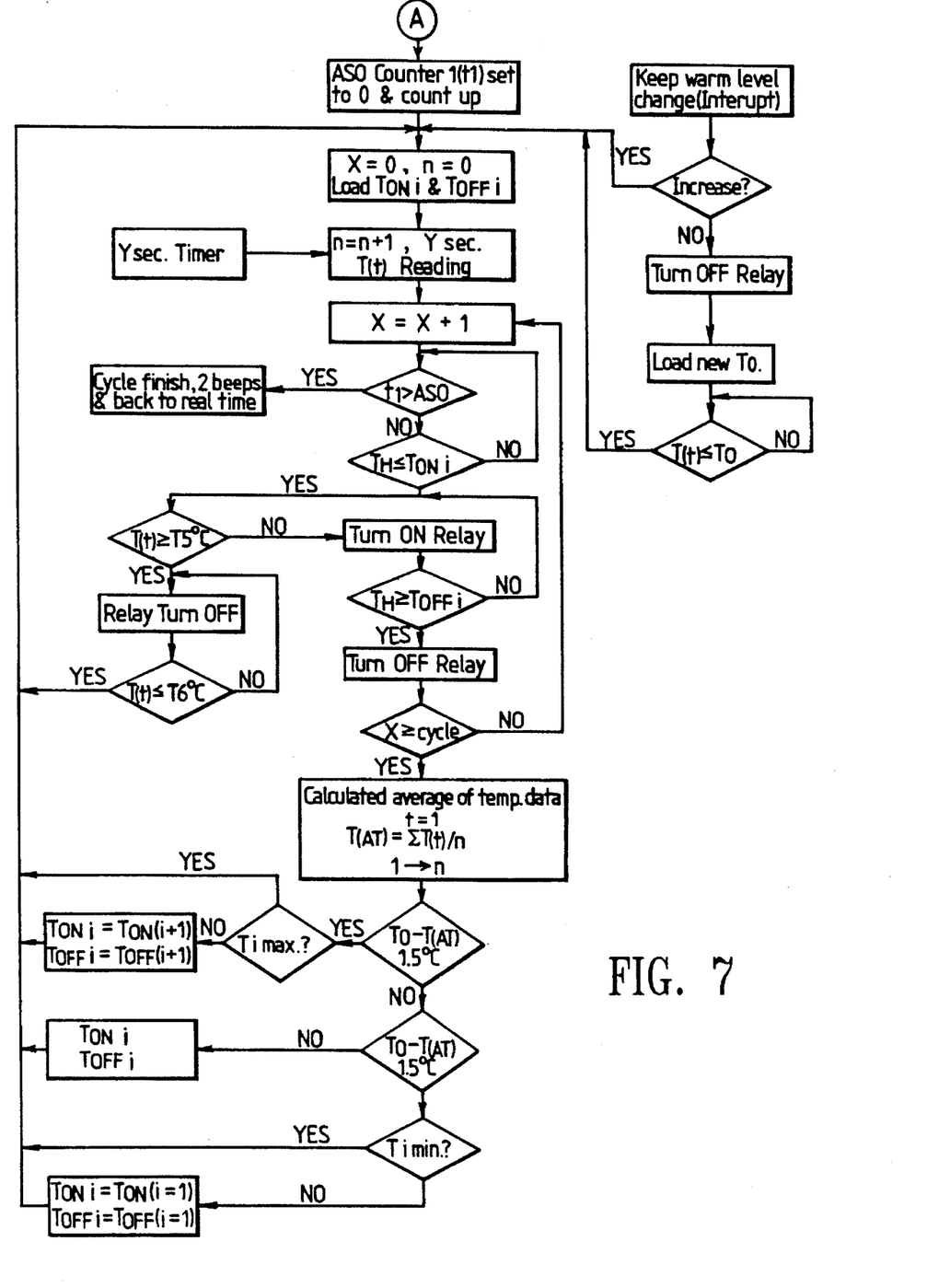
FIG. 7 is part of a flow chart for making and keeping warm a quantity of coffee showing the keeping warm part.

In FIG. 7, the flow chart for keeping warm mode also depends on temperature input signals from the thermistor 25 NCT2 which is located in the coffee machine to measure the effective temperature of the container 13 (FIG. 1). The keep warm temperature is controlled to sustain at a temperature chosen and settable by a user of the coffee machine. The keep warm mode starts at A (top of FIG. 7) which is as soon as the normal brewing finishes. The temperature is controlled by turning on the heater for a number of separate periods controlled according to one of the temperature settings +3 to −3 in FIG. 8. Every 10 seconds the actual water temperature is recorded by the microcomputer and an average temperature is calculated and compared with the chosen temperature.

Figure 8:
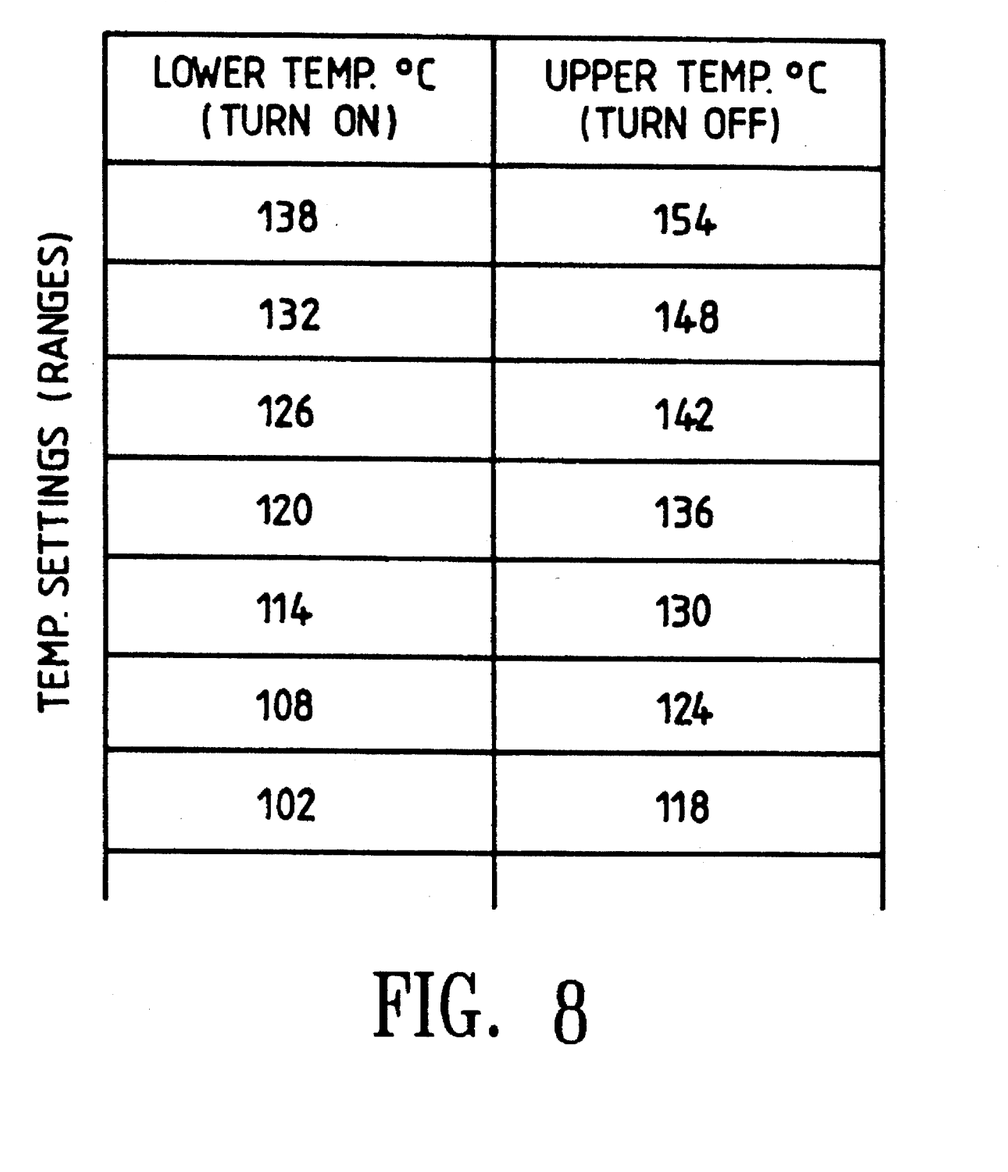
FIG. 8 is a table showing a range of temperatures for use in a programme of the microcomputer.

If at the end of the number of periods this average temperature is lower than the chosen temperature, the microcomputer will use one higher temperature settings of FIG. 8. If the average temperature is higher than the chosen temperature, the microcomputer will use one lower of the temperature settings. When the average temperature is the same as the target, the same keep warm level temperature settings are retained. After completing the number of periods each time, the microcomputer uses the new keep warm temperature settings to carry out the keep warm procedures until auto shut off time arrives. Of course, if the keep warm temper&turn setting is changed at any time by the user, the keep warm procedure will start again from the new keep warm chosen temperature level.

To explain the background, as the heater is not closely or directly associated with the water in the container 13 it cannot be safely or efficiently turned ON continuously to maintain for the keep warm function. On the one hand the heater would get too hot and on the other hand the speed at which heat can be transferred to the water is inherently too slow. Thus, in this embodiment the heater is turned ON and OFF according to a selected one of the settings in FIG. 8. For example, the temperature of water in the container 13 at the end of the brewing cycle is normally 84° C. On a normal mid-year day with the applicant's configuration, if the temperature settings O are chosen the contents of the container will remain substantially at 84° C., that is the "keep warm temperature" will be 84° C. If however the user choose a higher of lower keep warm temperature, then the microcomputer must and will choose, according to the flow chart in FIG. 7, a higher or lower range of settings.

The microcomputer will also automatically choose higher or lower settings according to a cooler or hotter day so as to sustain any chosen keep warm temperature. Thus, in embodiment of the invention, any keep warm temperature can be sustained as may be chosen by the user and irrespective of the environmental temperature. Changes in the latter will alter the natural rate of heat loss and without automatic control, according to the flow chart of FIG. 7, would lead to significant variations in the actual keep warm temperature in comparison to what the user had chosen.

In practice therefore if say the O settings are chosen, the heater is turned On when its temperature falls below 120° C. and OFF as soon as its temperature reaches 136° C. In fact, its temperature will invariably rise considerably above 136° C. in such circumstances and the temperature settings are chosen to allow for such rises to be within safe or non-damaging limits for the heater and its immediate surroundings. In the present embodiment, the heater will normally be turned on in practice for periods of about 20 or 30 seconds. According to the flow chart in FIG. 7 the number of separate periods chosen is 3 and then period will be completed in about 8 to 10 minutes. Thus, in the flow chart in FIG. 7 whenever X=3, a routine is carried out if the actual temperature differs from the target or chosen temperature by more than 1.5°.

As explained above, if the actual temperature is, say, too high a next lower temperature settings in FIG. 8 are automatically selected for the next number (three) of the heating periods.

Other routines will be noticed from the flow chart in FIG. 7. The logic flow is interrupted if the chosen keep warm temperature is adjusted or changed, the heater will be turned OFF if the detected temperature is higher than the target or chosen temperature; otherwise a new chosen temperature setting is used for keep warm. Finally, if the temperature at the sensor 25 is greater than T5, say 110° C., the heater will be turned OFF (or not turned ON). Such a condition will normally indicate the container 13 is not in position on the plate 22.

The keep warm mode may be arranged in different manner by responding to the thermistor element 17 at one set low level to normally turn ON the heater. For such an arrangement, the thermistor element could be replaced by a mechanical-type thermostat which normally closes and opens its contacts at fixed (low) turn ON and (high) turn OFF temperatures respectively. Only to turn ON feature is used. It has already been explained that it is not useful to turn on the heating element 10 for long periods of time; the same applies for this alternative keep warm arrangement. However, if a fixed low temperature signal of the thermistor element 17 (or the closure of contacts of a thermostat) is used for the turn ON temperature level, it is possible to maintain a chosen keep warm temperature under the control of the microcomputer. This is done by introducing a time delay for each relatively short period of heating between the moment the (low) temperature is reached and the moment the heater is turned ON. If the time delay is increased, the keep warm temperature will be lowered. Thus, the actual keep warm temperature is controlled by the microcomputer altering as required this time delay. The time delay is preferably altered automatically in response to a chosen temperature which can be sensed by monitoring the thermistor 25.

I claim:

1. A coffee making machine, comprising:

a water reservoir, a hopper for holding coffee grounds and positioned for receiving water from the reservoir, a container mountable below the hopper for collecting coffee from the hopper, the container defining a temperature, a water passageway through which water is conveyed from the reservoir to a location above the hopper, a heater having a heating element for heating water in the passageway, the heater defining a temperature, first thermistor means for providing a first temperature signal dependent on the temperature of the heater, second thermistor means for providing a second temperature signal dependant on the temperature of the container, programmable microcomputer means responsive to the first and second temperature signals for controlling the coffee making machine, the microcomputer means comprising means for switching the heater on and off to reach a temperature within a selected range for at least one heating period, means for comparing the temperature of the container and a preselected temperature after the at least one heating period, means for modifying the selected range for subsequent heating periods in response to comparing the temperature of the container and the preselected temperature, whereby differences between the temperature of the container and the preselected temperature are reduced.

2. The coffee making machine of claim 1, wherein the heater is operable to heat water from the reservoir at a water heating rate, and wherein the microcomputer means comprises means for turning the heater on and off intermittently at regular intervals during at least an initial period to slow the water heating rate.

3. The coffee making machine of claim 1, wherein the heater comprises a heat pump including a metallic body having a hollow tube connected to the passageway and an electrical heating element mounted in the metallic body adjacent the hollow tube, wherein water flows out of the heat pump at an overall flow rate, and wherein the microcomputer means comprises means for switching the heater on and off at regular intervals to slow the overall flow rate.

4. The coffee machine of claim 1, comprising means for manually adjusting the desired temperature.

5. A coffee making machine, comprising:

water reservoir, a hopper for holding coffee grounds and positioned for receiving water from the reservoir, a container mountable below the hopper for collecting coffee from the hopper, the container defining a temperature, a water passageway through which water is conveyed from the reservoir to a location above the hopper, a heater having a heating element for heating water in the passageway, the heater defining a temperature, the heater being operable to heat water from the reservoir at a water heating rate, the heater comprising a heat pump including a metallic body having a hollow tube connected to the passageway and an electrical heating element mounted in the metallic body adjacent the hollow tube, wherein water flows out of the heat pump at an overall flow rate, first thermistor means for providing a first temperature signal dependent on the temperature of the heater, second thermistor means for providing a second temperature signal dependant on the temperature of the container, programmable microcomputer means responsive to the first and second temperature signals for controlling the coffee making machine, the microcomputer means comprising means for switching the heater on and off at regular intervals to slow the overall flow rate, means for turning the heater on and off intermittently at regular intervals during at least an initial period to slow the water heating rate, means for switching the heater on at a temperature within a selected range for at least one heating period, means for comparing the temperature of the container and a preselected temperature after the at least one heating period, means for modifying the selected range for subsequent heating periods in response to comparing the temperature of the container and the preselected temperature, whereby differences between the temperature of the container and the preselected temperature are reduced.

* * * * *